(12) United States Patent
Shih

(10) Patent No.: US 6,954,807 B2
(45) Date of Patent: Oct. 11, 2005

(54) DMA CONTROLLER AND METHOD FOR CHECKING ADDRESS OF DATA TO BE TRANSFERRED WITH DMA

(75) Inventor: Chien-Yi Shih, Taipei (TW)

(73) Assignee: Via Technologies, Inc., Taipei (TW)

(*) Notice: Subject to any disclaimer, the term of this patent is extended or adjusted under 35 U.S.C. 154(b) by 76 days.

(21) Appl. No.: 10/443,377

(22) Filed: May 22, 2003

(65) Prior Publication Data

US 2003/0233497 A1 Dec. 18, 2003

(30) Foreign Application Priority Data

Jun. 18, 2002 (TW) ........................................ 91113308 A

(51) Int. Cl.[7] .............................................. G06F 13/28
(52) U.S. Cl. ................. 710/22; 710/3; 710/4; 710/26; 710/308; 711/200; 711/203
(58) Field of Search ................................. 710/3–4, 308, 710/22–28; 711/200, 203

(56) References Cited

U.S. PATENT DOCUMENTS 6,202,107 B1 * 3/2001 Collier ........................ 710/22
6,687,767 B2 * 2/2004 Butterfield ................... 710/22

* cited by examiner

*Primary Examiner*—Jeffrey Gaffin
*Assistant Examiner*—Mike Nguyen
(74) *Attorney, Agent, or Firm*—Madson & Metcalf

(57) ABSTRACT

The address of a data packet to be transferred from a memory to a network interface card within a direct memory access (DMA) is checked. First of all, the address of a descriptor corresponding to the data packet is read from the memory, wherein the descriptor contains information of the address of the data packet. Then, whether the address of the descriptor complies with a certain rule is determined. If the address of the descriptor does not comply with the certain rule, an interrupt signal is asserted to a processor to perform a corresponding interrupt service in order to re-read the address of the descriptor.

18 Claims, 6 Drawing Sheets

DMA CONTROLLER AND METHOD FOR CHECKING ADDRESS OF DATA TO BE TRANSFERRED WITH DMA

FIELD OF THE INVENTION

The present invention relates to a method for checking an address of a data to be transferred, and more particularly to a method for checking an address of a data to be transferred within direct memory access (DMA). The present invention also relates to a direct memory access (DMA) controller.

BACKGROUND OF THE INVENTION

In a direct memory access (DMA) transmission technology, a hardware apparatus, e.g. a hard-disk drive or a network interface card, can directly access data from a main memory without the facilitation of a microprocessor. Hence, the DMA transmission can efficiently reduce the loading of the microprocessor and enhance the data transmission performance.

Please refer to FIG. 1A which is a schematic circuit block diagram illustrating a conventional computer structure operating by using the DMA. The personal computer includes a microprocessor 10, a memory 11, a chip set 13 and a network interface card (NIC) 12 including a DMA controller 121. When the operating system (OS) is going to transmit a data file to the NIC 12, the microprocessor 10 is interrupted to transmit the data file in a data packet format to the memory 11 to be stored via the chip set 13, and then continues the suspended work. The DMA controller 121 of the NIC 12 directly reads the data packets associated with the data file from the memory 11 via the chip set 13 after receiving the start address of the data file. The data is stored into a first-in first-out (FIFO) buffer 122 of the DMA controller 121.

Please refer to FIG. 1B which is a schematic diagram illustrating a conventional storage format of the main memory 11 for storing data packets. The main memory 11 includes two major portions, i.e. a descriptor and a data buffer for storing data packets. The descriptor includes the information of the stored address of a data packet in the data buffer, data length, data status and a descriptor address of next data packet.

Typically, after reading the descriptor of a data packet from the memory 11, the DMA controller 121 picks up the data packet from the data buffer according to the stored address of the data packet, and stores the data packet to the FIFO buffer 122 of the DMA controller 121. Then, the NIC 12 asserts a signal to the descriptor of the data packet to re-write the data status of the data packet. Further, the NIC 12 locates the descriptor of next data packet according to the information included in the descriptor of the preceding data packet, and receives the subsequent data packet according to the corresponding descriptor. The data status of the data packets received by the NIC 12, which is recorded in the descriptor, is checked by the microprocessor 10 to determine whether the data packet transmission is normal or not.

Since the above data transmission process is performed on the basis of the information recorded in the descriptor, the possible errors associated with the descriptor will result in abnormal transmission. The possible errors may include the error occurring inside the hardware and the error occurring in the data-reading process of the DMA controller. For example, due to the error occurring inside the hardware, the DMA controller may read wrong descriptor so as to result in a transmission error. For another example, due to the error occurring in the data-reading process of the DMA controller, the DMA controller may pick up a wrong data packet from a data buffer that does not comply with the current descriptor. Such transmission errors will cause the DMA controller to receive incorrect following data packets or access data packets from an invalid region. Practically, even though the above errors occur, the operating system will not notice until the file transmission is failed or the transmitted file is wrong. At this moment, the driver will assert a reset signal to the NIC to re-transmit the data packets. Since the operating system cannot timely detect the above transmission problems, the data transmission efficiency is adversely affected.

Therefore, the object of the present invention is to quickly determine whether the descriptor address to be read by the DMA controller is correct or not.

SUMMARY OF THE INVENTION

An object of the present invention is to provide a direct memory access (DMA) controller and a method for checking an address of a data to be transferred by using the DMA, which have enhanced data transmission performance.

According to an aspect of the present invention, there is provided a method for checking an address of a data packet to be transferred from a memory to a hardware device by using the direct memory access (DMA). The method includes a step of reading the address of a descriptor corresponding to the data packet from the memory. The descriptor contains information of the address of the data packet. The method also includes steps of determining whether the address of the descriptor complies with a certain rule, asserting an interrupt signal to a processor to perform a corresponding interrupt service when the address of the descriptor does not comply with the certain rule, and re-reading the address of the descriptor of the data packet in response to the corresponding interrupt service.

Preferably, the method further includes a step of reading the descriptor of the data packet to realize the address of the data packet according to the address thereof when the address of the descriptor complies with the certain rule.

Preferably, the address of the descriptor is determined to comply with the certain rule if the address of the descriptor is within a region of the memory confined between a first predetermined address and a second predetermined address and specified for storing descriptors. The first and second predetermined addresses are preferably stored in a first and a second registers of a DMA controller of the hardware device, respectively.

Preferably, the address of the descriptor is determined to comply with the certain rule if the address of the descriptor is one of addresses determined according to an operational formula for storing descriptors. The addresses for storing the descriptors are preferably determined by a logic operation device of a DMA controller of the hardware device.

For example, the memory can be a main memory of a personal computer, and the hardware device can be a network interface card, a hard disk drive, a sound card or a modem card.

According to another aspect of the present invention, there is provided a method for transferring a data packet from a memory to a network device by using the direct memory access (DMA) technology. The method includes steps of reading the address of a descriptor corresponding to the data packet from the memory, the descriptor containing information of the address of the data packet, checking whether the address of the descriptor is correct by comparing the address of the descriptor with a first and a second predetermined addresses, asserting an interrupt signal to a processor to perform a corresponding interrupt service when the address of the descriptor is not correct, and re-reading the address of the descriptor of the data packet in response to the corresponding interrupt service, and locating and reading the descriptor in the memory when a correct address of the descriptor is realized, and transferring the data packet from the memory to the network device according to the information contained in the descriptor.

Preferably, the method further includes steps of requesting a specified range of the memory from an operating system of a computer host via a driver for storing descriptors upon the computer host is initialized, and presetting a starting and an end addresses of the specified range as the first and second predetermined addresses, respectively. For example, the memory can be a main memory, the network device can be a network interface card, and the data packet can be transferred from the main memory to a DMA controller of the network interface card via a chipset. Preferably, the processor asserts the interrupt signal to perform the corresponding interrupt service via the chipset.

Preferably, the information of the descriptor contains the address of the data packet in the memory, the length and status of the data packet, and the address of a descriptor corresponding to another data packet next to the data packet.

Preferably, the data packet is transferred to a first-in first-out (FIFO) buffer of the DMA controller of the network device.

According to a further aspect of the present invention, there is provided a direct memory access (DMA) controller, being connected to a chipset that is further connected to a processor and integrated in a hardware device for directly accessing a data packet from a memory. The DMA controller reads the address of a descriptor of the data packet from the memory to locate the descriptor, and transfers the data packet according to the address of the data packet recorded in the descriptor. The DMA controller includes a discriminating device connected to the chipset to check whether the read address of the descriptor is correct according to a specified rule.

In an embodiment, the read address of the descriptor is determined to be correct by the discriminating device when the address of the descriptor lies between a first predetermined address and a second predetermined address. Preferably, the first and second predetermined addresses are stored in both a first and a second registers of the discriminating device, respectively.

In an embodiment, the read address of the descriptor is determined to be correct by the discriminating device when the address of the descriptor complies with an operational formula. Preferably, whether the address of the descriptor complies with an operational formula is determined by a logic operation circuit of the discriminating device.

BRIEF DESCRIPTION OF THE DRAWINGS

The present invention may best be understood through the following description with reference to the accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

Figure 1A:
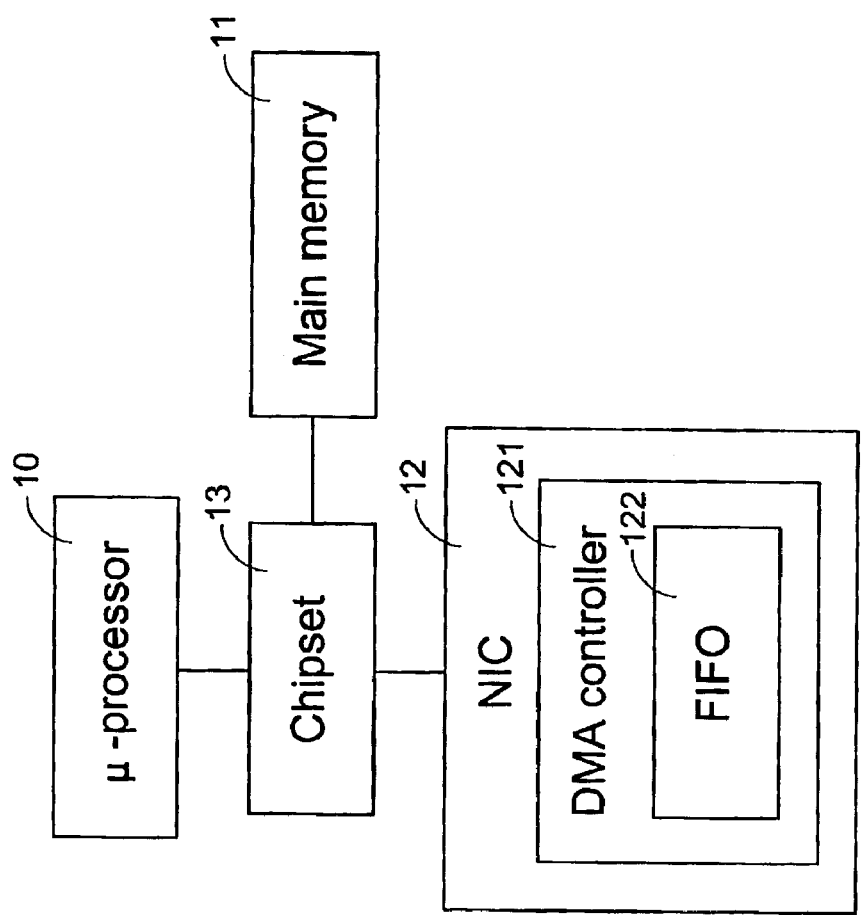
FIG. 1A is a schematic circuit block diagram illustrating a conventional computer structure operating by using the DMA.
Figure 1B:
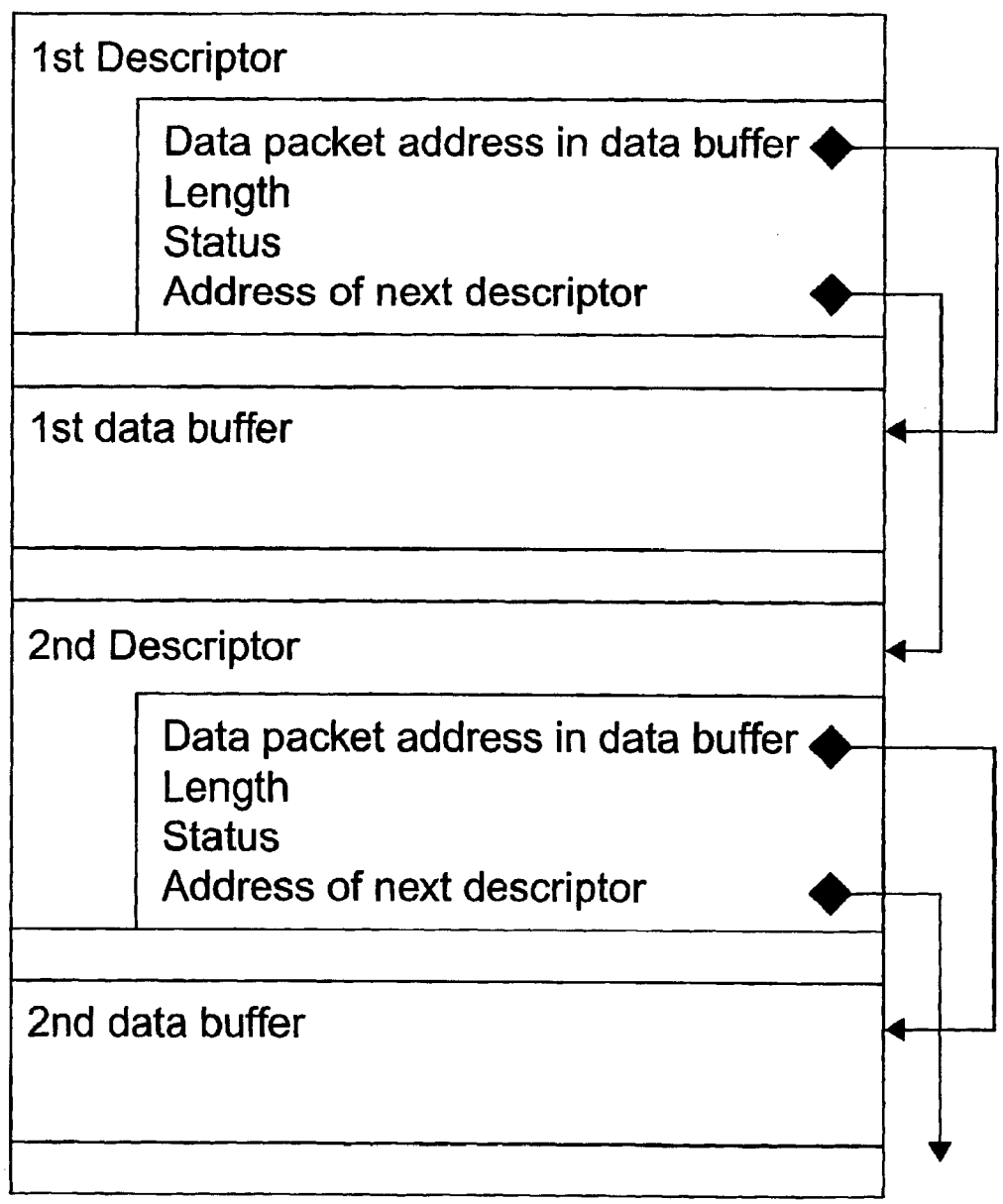
FIG. 1B is a schematic diagram illustrating a conventional storage format of the main memory for storing data packets.
Figure 2A:
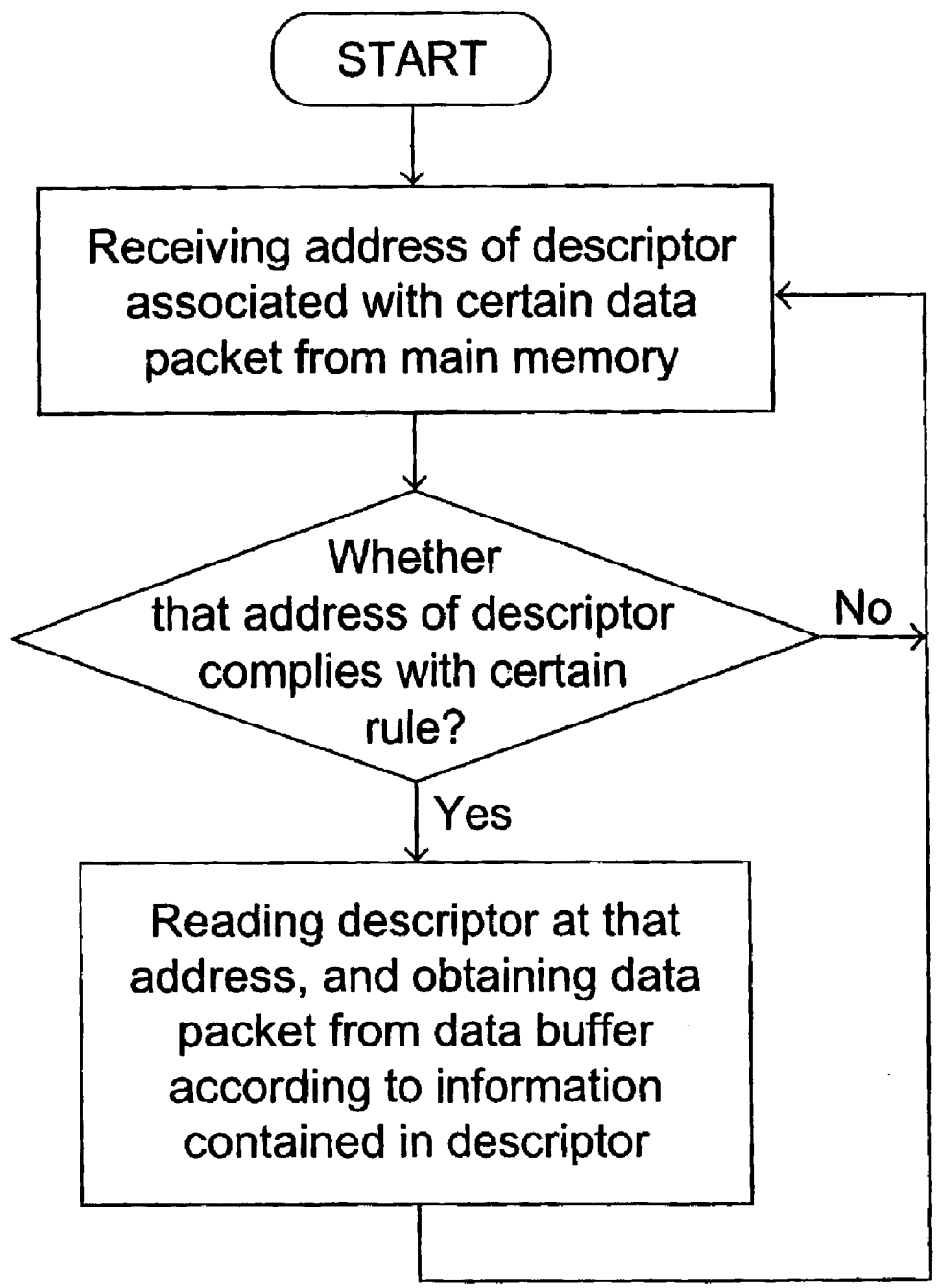
FIG. 2A is a flowchart illustrating a preferred embodiment of a method for checking an address of a data packet to be transferred by using the direct memory access (DMA) technology according to the present invention.

Please refer to the flowchart of FIG. 2A. A preferred embodiment of a method for checking an address of a data packet to be transferred by using a direct memory access (DMA) according to the present invention is illustrated. The method is used in a DMA controller connected to a chipset. The chipset is further connected to a main memory and a microprocessor and the DMA controller is included in a network interface card (NIC). As shown in FIG. 2A, first of all, the address of a descriptor corresponding to a first data packet stored in the main memory is received. The descriptor contains therein the address information of the first data packet. Subsequently, the address of the descriptor is checked and determined whether to comply with a certain rule. The certain rule will be described later in various embodiments.

When the address of the descriptor does not comply with the certain rule, it is determined that an error situation occurs. Accordingly, the NIC asserts an interrupt signal to have the microprocessor perform a corresponding interrupt service. Meanwhile, various measures are taken to remedy different error situation. For example, when the error situation occurs in the internal hardware of the NIC, the NIC is re-driven. On the other hand, if the error situation occurs in the transmitting end (Tx) or the receiving end (Rx) of the DMA controller, only the erroneous part is required to be re-driven. Then, the DMA controller receives the address of the descriptor corresponding to the first data packet once more.

Figure 2B:
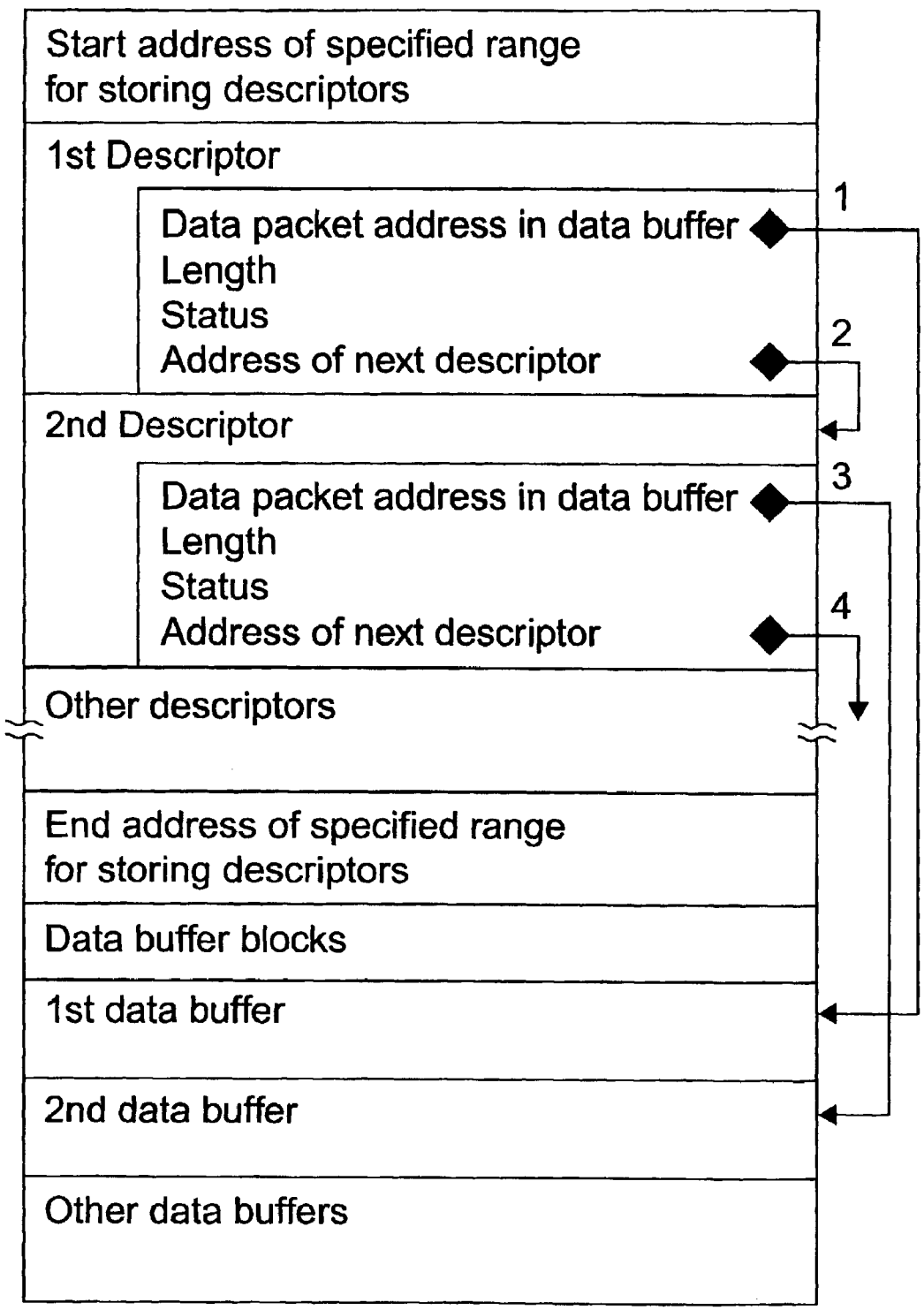
FIG. 2B is a schematic diagram illustrating a preferred embodiment of a storage format of the main memory for storing data packets according to the present invention.

When the address of the descriptor complies with the certain rule, it is determined that the descriptor is correct and reliable. Thus, the DMA controller reads the descriptor of the data packet, takes the data packet stored in the data buffer region according to the address recorded in the descriptor, as indicated by the path "1" in FIG. 2B, and transfers the data packet to a first-in first-out (FIFO) buffer. Subsequently, the address of another descriptor is realized from the previously read descriptor, which records therein the address information of a second data packet, as indicated by the path "2" in FIG. 2B. By determining whether the address of the descriptor corresponding to the second data packet complies with the certain rule or not, the reliability of the descriptor can be determined. If the address of the descriptor complies with the certain rule, the second data packet can be located, as indicated by the path "3" in FIG. 2B, and transferred according to the address recorded in the corresponding descriptor. Further, next descriptor associated with next data packet can be located, as indicated by the path "4" in FIG. 2B, and discriminated. The above-mentioned procedures are repeated to locate and transfer data packets. However, if any of the addresses of the descriptors does not comply with the certain rule, the NIC will timely asserts an interrupt signal, and the microprocessor will timely perform an interrupt service in response to the interrupt signal, thereby efficiently solving the error problems.

Figure 3A:
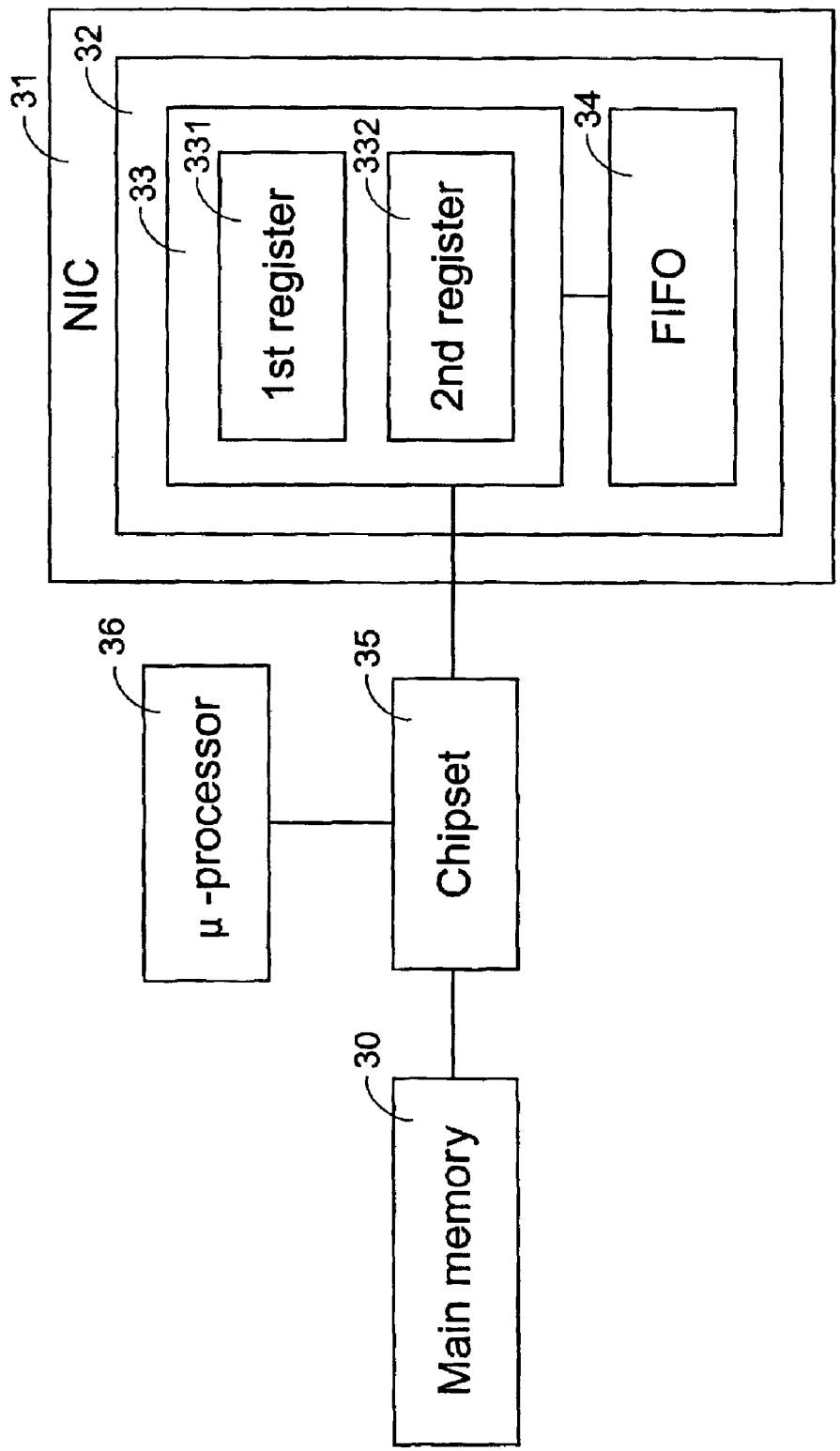
FIG. 3A is a schematic circuit block diagram illustrating a preferred embodiment of a computer structure operating by using the DMA mode according to the present invention.
Figure 3B:
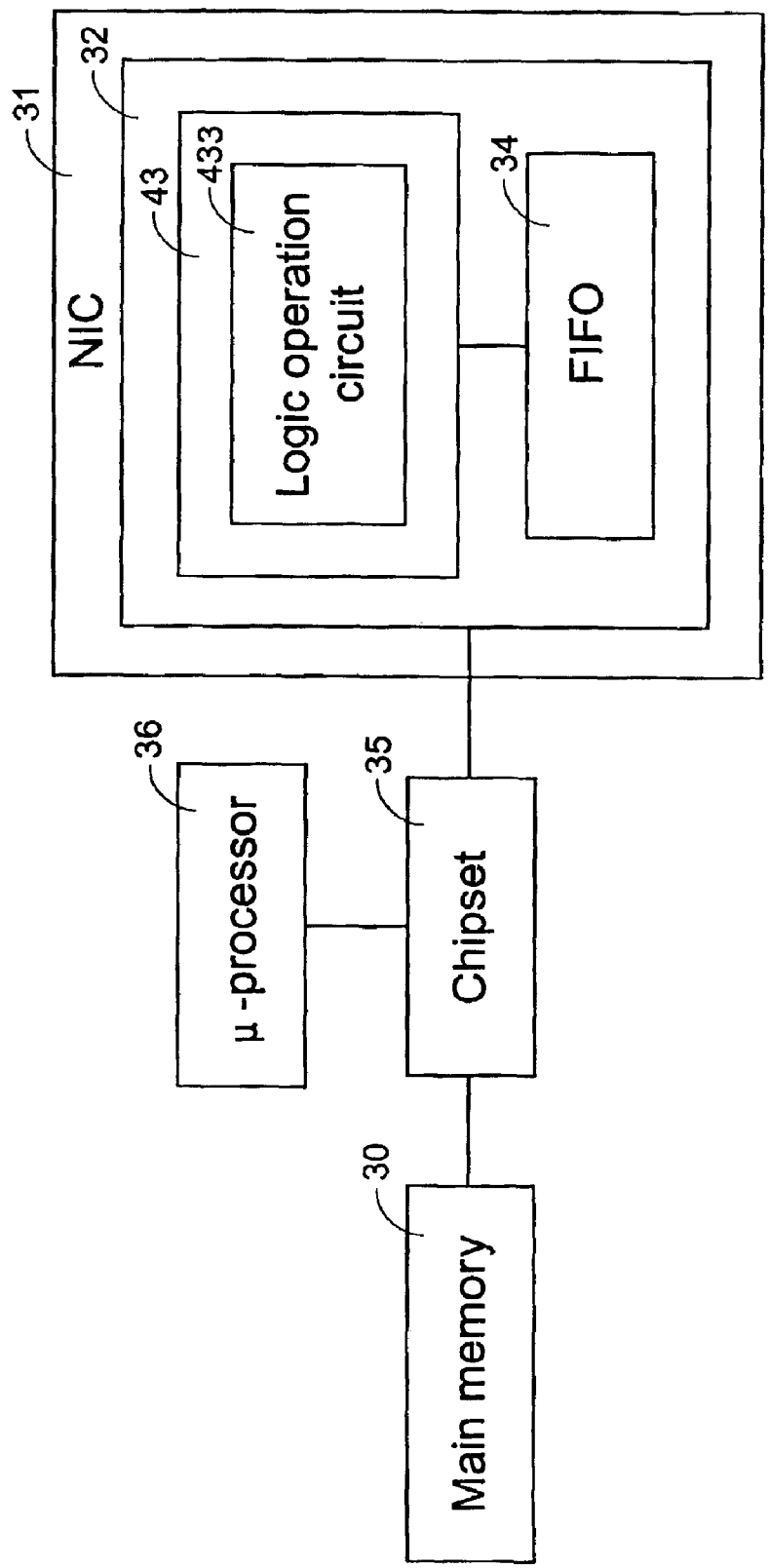
FIG. 3B is a schematic circuit block diagram illustrating another preferred embodiment of a computer structure operating by using the DMA according to the present invention.

Hereinafter, embodiments of the certain rule are described with reference to the block diagrams of associated devices, as shown in FIGS. 3A and 3B.

In the embodiment shown in FIG. 3A, the address of the descriptor is determined to comply with the certain rule if the address of the descriptor is within a region of the memory specified for storing descriptors and confined between a first predetermined address and a second predetermined address. As shown, the NIC 31 transfers data with the main memory 30 via the chipset 35 by a DMA controller 32 thereof. For practicing this embodiment, a discriminating device 33 comprising a first and a second registers 331 and 332 are provided in addition to a first-in first-out (FIFO) buffer 34 in the DMA controller 32. When the computer host is has been initialized and normally operates, the driver of the NIC requests a specified range of the main memory 30 from the operating system (OS) for regularly storing the descriptors of data packets. The first predetermined address is preferably the starting address of the specified range and the second predetermined address is preferably the end address of that the specified range. The first and second predetermined addresses are stored in the first and second registers 331 and 332 of the DMA controller 33, respectively. Thus, the DMA controller 33 immediately compares the address of the incoming descriptor with the first and the second predetermined addresses stored in the registers 331 and 332 so as to efficiently determine whether an error occurs in the address of the descriptor. If the address of the descriptor lies between the first and the second predetermined addresses, the address of the descriptor is determined to comply with the certain rule, and thus the corresponding data packet and next descriptor can be located. Otherwise, the NIC 31 will assert an interrupt signal to the microprocessor 36 via the chipset 35 to request an interrupt service, as mentioned above, for re-reading the descriptor.

In the embodiment shown in FIG. 3B, the address of the descriptor is determined to comply with the certain rule if the address of the descriptor is one of the addresses determined according to an operational formula for storing descriptors. For practicing this embodiment, a discriminating device 43 comprising a logic operation circuit 433 is provided in addition to a first-in first-out (FIFO) buffer 34 in the DMA controller 32. The driver of the NIC 31 requests all addresses complying with the specified operational formula in the main memory 30 from the operating system (OS) of the computer host upon the computer host is initialized. These addresses are specifically used for storing descriptors. Whether the address of an incoming descriptor complies with the specified operational formula or not is determined by the logic operation circuit 433 of the DMA controller 32. When the operation result of the descriptor address is not correct, i.e. the result does not reflect to any of these descriptor addresses, it is determined that an error occurs. If the address of the descriptor fits the specified operational formula, the address of the descriptor is determined to comply with the certain rule, and thus the corresponding data packet and next descriptor can be located. Otherwise, the NIC 31 will assert an interrupt signal to the microprocessor 36 via the chipset 35 to request an interrupt service, as mentioned above, for re-reading the descriptor.

According to the above description and illustration, it is understood that the DMA controller according to the present invention is able to properly and efficiently locate the addresses of data packets by timely discriminating whether the address of each incoming descriptors correct or not. If there is any error occurring, an interrupt signal is immediately asserted to re-read the descriptor instead of waiting until the file transmission is failed or the entire transmitted file is noticed to be wrong. The present invention is especially advantageous for a server including several network interface cards (NICs). By timely asserting interrupt signals in a manner mentioned above, the data transmission efficiency of the network interface cards will be significantly improved.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for checking an address of a data packet to be transferred from a memory to a hardware device by using a direct memory access (DMA), comprising steps of:

reading the address of a descriptor corresponding to said data packet from said memory storing therein said data packet, said descriptor containing information of said address of said data packet;

determining whether the address of said descriptor is one of addresses determined according to an operational formula for storing descriptors;

asserting an interrupt signal to a processor to perform a corresponding interrupt service when the address of said descriptor is not one of addresses determined according to said operational formula for storing descriptors; and re-reading the address of said descriptor of said data packet in response to said corresponding interrupt service.

2. The method according to claim 1 further comprising a step of reading said descriptor of said data packet to realize said address of said data packet according to the address thereof when the address of said descriptor is one of addresses determined according to said operational formula for storing descriptors.

3. The method according to claim 1 wherein said addresses for storing said descriptors are determined by a logic operation device of a DMA controller of said hardware device.

4. The method according to claim 1 wherein said memory is a main memory of a personal computer, and said hardware device is a network interface card, a hard disk drive, a sound card or a modem card.

5. A method for transferring a data packet from a memory to a network device by using a direct memory access (DMA), comprising steps of:

reading the address of a descriptor corresponding to said data packet from said memory, said descriptor containing information of said address of said data packet;

checking whether the address of said descriptor is correct by comparing the address of said descriptor with a first and a second predetermined addresses of said memory storing therein said data packet;

asserting an interrupt signal to a processor to perform a corresponding interrupt service when the address of said descriptor is not correct, and re-reading the address of said descriptor of said data packet in response to said corresponding interrupt service; and locating and reading said descriptor in said memory when a correct address of said descriptor is realized, and transferring said data packet from said memory to said network device according to the information contained in said descriptor.

6. The method according to claim 5 further comprising steps of:

requesting a specified range of said memory from an operating system of a computer host via a driver for storing descriptors upon said computer host is initialized; and presetting a starting and an end addresses of said specified range as said first and second predetermined addresses, respectively.

7. The method according to claim 6 wherein said memory is a main memory, said network device is a network interface card, and said data packet is transferred from said main memory to a DMA controller of said network interface card via a chipset.

8. The method according to claim 7 wherein said processor asserting said interrupt signal to perform said corresponding interrupt service via said chipset.

9. The method according to claim 5 wherein the address of said descriptor is determined to be correct when the address of said descriptor is between said first predetermined address and said second predetermined address.

10. The method according to claim 5 wherein the information of said descriptor contains the address of said data packet in said memory, the length and status of said data packet, and the address of an descriptor corresponding to another data packet next to said data packet.

11. The method according to claim 5 wherein said data packet is transferred to a first-in first-out (FIFO) buffer of said DMA controller of said network device.

12. A direct memory access (DMA) controller, being connected to a chipset that is further connected to a processor and integrated in a hardware device for directly accessing a data packet from a memory, said DMA controller reading the address of a descriptor of said data packet from said memory to locate said descriptor, and transferring said data packet according to the address of said data packet recorded in said descriptor, and said DMA controller comprising a discriminating device connected to said chipset to check whether the read address of said descriptor in said memory storing therein said data packet is correct according to a specified rule.

13. The DMA controller according to claim 12 wherein the read address of said descriptor is determined to be correct by said discriminating device when the address of said descriptor lies between a first predetermined address and a second predetermined address.

14. The DMA controller according to claim 13 wherein said first and second predetermined addresses are stored in a first and a second registers of said discriminating device, respectively.

15. The DMA controller according to claim 12 wherein the read address of said descriptor is determined to be correct by said discriminating device when the address of said descriptor complies with an operational formula.

16. The DMA controller according to claim 15 wherein whether the address of said descriptor complies with an operational formula is determined by a logic operation circuit of said discriminating device.

17. The DMA controller according to claim 12 wherein said memory is a main memory, and said hardware device is a network interface card, a hard disk drive, a sound card or a modem card.

18. The DMA controller according to claim 17 wherein said data packet is transferred from said main memory to a first-in first-out (FIFO) buffer of said DMA controller of said network interface card.

* * * * *